United States Patent [19]

Hall et al.

[11] Patent Number: 4,589,535

[45] Date of Patent: May 20, 1986

[54] FAN CLUTCH WITH REPLACEABLE PLATE CARRIER MEMBER

[75] Inventors: John L. Hall, Middleburg Hts.; Dennis R. Shamine, Lorain; James P. Koenig, Olmsted Twp., Lorain County, all of Ohio

[73] Assignee: Allied Corporation, Morristown, N.J.

[21] Appl. No.: 650,951

[22] Filed: Sep. 17, 1984

[51] Int. Cl.[4] .................. F16D 13/70; F16D 13/74
[52] U.S. Cl. ........................ 192/70.12; 192/70.13; 192/113 B; 192/110 B; 184/6.16
[58] Field of Search .......... 192/113 B, 109 F, 110 B, 192/70.12, 70.13; 184/6.16; 74/467

[56] References Cited

U.S. PATENT DOCUMENTS

| | | | |
|---|---|---|---|
| 3,175,661 | 3/1965 | Maurer et al. | 192/113 B |
| 3,612,237 | 10/1971 | Honda | 192/109 F |
| 3,650,364 | 3/1972 | Laing | 192/109 F |
| 3,690,429 | 9/1972 | Honda | 192/113 B |
| 3,948,354 | 4/1976 | Fosse et al. | 184/6.16 X |
| 3,982,618 | 9/1976 | Horsch | 192/113 B |
| 4,231,457 | 11/1980 | Cornish | 192/82 |
| 4,274,298 | 6/1981 | Ostrander | 74/467 |
| 4,327,598 | 5/1982 | Yoneda et al. | 74/467 |
| 4,442,929 | 4/1984 | Uchida | 192/109 F |

Primary Examiner—George H. Krizmanich
Attorney, Agent, or Firm—Ken C. Decker; William N. Antonis

[57] ABSTRACT

A clutch assembly includes an input member, an output member, and clutch plates connected to the input and output members which are driven into drive engagement with one another when the clutch is engaged to connect the output member for rotation with the input member. The clutch plates carried on the input member are mounted on a separate clutch plate carrying member, which is machined before installation on the input member to thereby facilitate manufacture and assembly of the device. A fluid pressure responsive piston operates the clutch plates, and has an outer diameter slidingly and sealingly engaged with the wall to bore of the housing of the input or driving member, and its inner diameter slidingly engaged with an annular retainer which is mounted for rotation with the input member. A pair of roller bearings mount the input or driving member on a fixed spindle and on the output member, and bypass passages are provided around the bearings to assure that fluid pressure can be relieved from oil seals sealing the bore and the bearings within the housing defined by the input or driving member.

10 Claims, 1 Drawing Figure

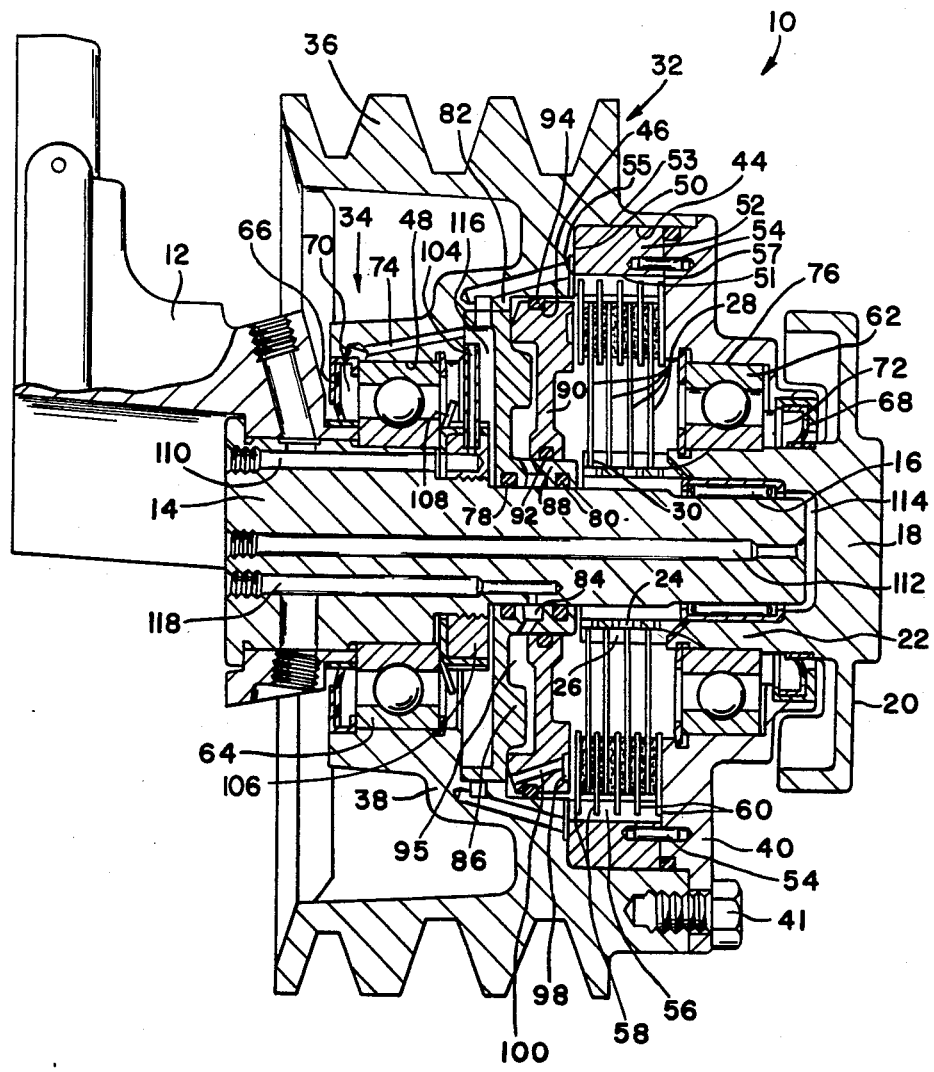

FAN CLUTCH WITH REPLACEABLE PLATE CARRIER MEMBER

This invention relates to thermostatically controlled fan clutch drives, of the type used to control the cooling fan of a vehicle engine.

Modern vehicles are equipped with engines having cooling fans which are provided to draw air through the engine radiator. These fans, in the past, have been connected for continuous operation while the vehicle engine is turned on, even though the cooling effect of the fan is necessary only during a relatively small percentage of the time that the vehicle is operated. Such cooling fans draw a not insignificant portion of the power generated by the vehicle engine. Accordingly, it is desirable to disconnect the driving connection between the vehicle engine and the fan when the cooling effect of the fan is not necessary, since continuous operation of the fan reduces engine power and increases fuel consumption. The foregoing is particularly true on heavy duty line haul trucks, in which the cooling effect of the fan is necessary for only a very small percentage of the time the vehicle is operated, and the percentage of the power consumed by the fan is relatively high.

Fan clutch drives which connect and disconnect the cooling fan from the engine of a heavy duty vehicle have been proposed before. A typical fan clutch drive is disclosed in U.S. Pat. No. 4,231,457, issued Nov. 4, 1980 to Cornish. The Cornish patent relates to a so-called "wet" fan drive, in which clutch plates are provided in a sealed cavity through which lubricating fluid is continually circulated to both cool and lubricate the clutch plates and the necessary bearings. One problem with the Cornish design is that one set of the clutch plates are splined to the rather complex cylinder member which is located within the fan drive, thereby making the fan drive relatively difficult to manufacture. Another problem with wet fan clutch drives is that rotating oil seals must be provided to retain the fluid within the drive housing. Since the fluid must be circulated through the bearings to provide lubrication, this fluid is often trapped between the bearings and the oil seals, eventually causing the oil seals to leak.

Accordingly, one advantage of the present invention is that manufacture of the device disclosed herein is facilitated because one set of the clutch plates is carried on a separate carrier installed in the housing, which may be machined first and installed during assembly of the device. Another advantage of the invention is that bypass passages are provided around the bearings, to permit lubricating oil to escape from the cavity defined between the bearings and the oil seals, thereby relieving pressure on the oil seals to prevent them from leaking.

These and other advantages of the invention will become apparent from the following specification with reference to the accompanying drawing, the sole figure of which is a longitudinal cross-sectional view of a fan clutch drive made pursuant to the teachings of the present invention.

Referring now to the drawing, a fan clutch drive generally indicated by the numeral 10 includes a fixed support generally indicated by the numeral 12 from which a spindle 14 extends. A set of conventional needle bearings generally indicated by the numeral 16 mount an output or a driven member generally indicated by the numeral 18 on the spindle 14. Driven member 18 is provided with a fan mounting surface generally indicated by the numeral 20, upon which a conventional engine cooling fan (not shown) is mounted. The driven member 18 further includes an annular cylindrical portion 22 which extends leftwardly from the fan mounting surface 20 viewing the Figure and which terminates in a splined section 24 on which are cut circumferentially spaced splines 26. Splines 26 slidably receive axially spaced clutch plates 28, which are provided with keyways 30 which are received on the splines 26.

A driving member generally indicated by the numeral 32 includes a housing 34 on which a pulley face 36 is provided to accommodate a belt driven connection between the driving member 32 and the vehicle engine. The driving member 32 comprises a two part housing comprising a body portion 38 and a cover portion 40 which is secured to the body portion 38 by bolts 41. The body portion 38 defines a stepped bore therewithin comprising a larger diameter section 44, a portion 46 of intermediate diameter, and a smaller diameter portion 48. The larger diameter portion 44 and portion of intermediate diameter 46 cooperate to define a shoulder 50 therebetween thus providing an annular cavity between the shoulder 50, the larger diameter portion 44, and the cover 40, which covers the open end of the bore. An annular clutch plate carrying member 52 is disposed within the cavity defined by the shoulder 50, larger diameter portion 44 the bore, and the cover member 40.

Clutch plate carrying member 52 includes inner and outer axially projecting circumferential surfaces 51, 53, and a pair of axially spaced, radially projecting surfaces 55, 57 which interconnect the ends of the circumferential surfaces. The radially projecting surfaces are engaged by the shoulder 50 and the cover member 40 to locate the carrying member in the cavity. Circumferentially spaced drive pins 54 drivingly connect the cover member 40 with the clutch plate carrying member 42. The inner circumferential surface of the clutch plate carrying member 52 is machined to provide circumferentially spaced, axially extending splines 56 which slidably mount a set of clutch plates 58 through keyways 60 on the clutch plates which are slidably received on the splines 56. The clutch plates 58 are alternated with the clutch plates 28, and each of the clutch plates 28, 58 are provided with friction surfaces where the clutch plates engage one another.

A roller bearing 62 and a roller bearing 64 rotatably support the driving or input member 32 on the output member 18 and on the spindle 14 respectively. A pair of oil seals 66, 68 cooperate with the bearings 64, 62 respectively to define cavities 70, 72 therebetween. The oil seals prevent fluid from leaking from the cavities 70, 72. Bypass passages 74, 76 are provided around the bearings 62, 64 to relieve oil pressure in the cavities 70, 72 as will be described hereinafter.

A pair of rotating seals 78, 80 rotatably mount an annular retaining member 82 on the spindle 14. The seals 78, 80 cooperate with the annular retainer member 82 to define a cavity 84 therebetween. The retainer member 82 includes a radially projecting portion 86 and a circumferentially extending surface 88. A piston 90 is provided with an 0-ring seal 92 which sealingly engages the axial extending surface 88 and another 0-ring seal 94 which slidably engages the intermediate diameter portion 46 of the aforementioned bore. Accordingly, the piston 90 cooperates with the annular retaining member 82 to define a compartment 95 therebetween which is communicated with the annular cavity 84 through a passage 96. The forward face of the piston 90 is provided with an annular groove 98 which communicates through a passage 100 in the piston 90 with the fluid contained in the compartment 95.

Three circumferentially spaced tubes (only one of which is illustrated as at 104) extend a radial from, and are integral with, a lock nut 106 which is threadably mounted on the spindle 14. The lock nut 106 cooperates with an annular retaining washer 108. The passage defined within the tubes 104 cooperate with a return passage generally indicated by the numeral 110.

Lubricating fluid is communicated to the fan clutch drive through an inlet passage 112 from, for example, the vehicle engine. The fluid in passage 112 is communicated into a cavity 114 defined between the end of the spindle 14 and the cylindrical portion 22 of the output or driven member 18. Fluid from the cavity 114 circulates through the needle bearings 16, through the bearings 62 and into the cavity 72, through the clutch plates 28, 58 and through the passage 102 to the section 116 of the bore defined within the housing 34 in which the tubes 104 are disposed. Fluid in the section 116 also circulates through the bearing 64 to the cavity 70, and returns to the section 116 through the bypass passage 74. Since rotation of the fan clutch drive 10 develops centrifugal forces that tend to force the lubricating oil radially outwardly viewing the drawing, the tubes 104 are necessary to communicate the fluid at the outer circumferential portion of the fan clutch drive 10 back into the return passage 110 through the tubes 104 and the lock nut 106.

Actuation pressure is communicated to the annular cavity 84 from inlet passage 118. Fluid communication to the inlet passage 118 is controlled by a conventional thermostatically actuated valve (not shown), which transmits fluid pressure through the passage 118 when the fan clutch drive 10 is to be engaged. Fluid from the passage 118 is communicated through the cavity 84 into the compartment 95, where it acts on the piston 90, urging the latter to the right viewing the Figure. A portion of the fluid on the right side, viewing the Figure, of the piston 90 is relieved through the annular groove 98 and the passage 100. However, the rate of leakage through the passage 100 is less than the rate fluid is communicated to the compartment 95, so that the piston 90 moves toward the clutch plates 28, 58, but at a reduced rate because of the leakage through passage 100. As the piston 90 engages the clutch plate 58 facing the piston 90, the groove 98 is sealed, thereby closing communication through the passage 100. Accordingly, full pressure builds in the compartment 95 so that the clutch plates 28, 58 are forced into driving engagement with one another. Accordingly, initial engagement of the clutch is smoothed by the leakage through passage 100. Therefore, a driving connection is provided between the input and output members through the clutch plates and the splined connections on each of the members. When the clutch is being disengaged, communication through the passage 118 is cut off and the fluid in passage 118 is relieved to a reservoir, thereby relieving the pressure in the compartment 95, to permit leakage through the passage 100 to relieve pressure on the plates 28, 58, to thereby permit the clutch plates to move away from one another a small amount to permit the driving and driven members to rotate relative to one another. Since the passage 100 is at an angle with respect to piston 90, all the fluid can be relieved from the clutch plates to prevent the clutch from partially engaging due to centrifugal force which would pressurize any oil left in the cavity housing the clutch plates.

Of course, rotation of the fan clutch drive 10, as discussed above, causes the lubricating fluid to be urged readily outwardly, and the fluid communicated through the bearings 62, 64 would be retained in the cavities 72, 74, thereby exerting extra pressure on the oil seals to cause them to leak. However, the bypass passages 74, 76, relieve the pressure in the cavities 72, 74.

Machining and assembly of the fan clutch drive 10 is facilitated because the splines 56 are machined on the separate clutch carrying member 52 before the latter is installed in the annular area defined by the larger section 44, the shoulder 50 and the cover member 40. Accordingly, the splines 56 can rather easily be cut on this member before it is installed, and upon installation the corresponding clutch plates 58 can be installed thereon.

We claim:

1. Clutch assembly comprising a fixed support, an input member and an output member mounted on said fixed support, bearing means for rotatably mounting the input and output members on said fixed support for rotation relative to the fixed support and relative to one another, a first set of clutch plates drivingly connected to said output member, a second set of clutch plates drivingly connected with the input member and cooperatively arranged with the first set of clutch plates to provide a driving connection therebetween when the clutch is engaged, one of said members including a housing, said housing defining a stepped bore coaxial with the axis of rotation of said input and output members, said bore having larger and smaller diameter portions with a shoulder therebetween, said shoulder cooperating with the larger portion of the bore to define an annular cavity, an annular clutch plate carrying member coaxial with said bore and received within said annular cavity, said clutch plate carrying member having axially projecting inner and outer circumferential surfaces, a pair of axially spaced, radially projecting surfaces interconnecting said axially projecting surfaces, said radially projecting surfaces being engaged by said shoulder and with said housing to retain the carrying member in said cavity, mounting means carried on said inner diameter surface slidably mounting said second set of clutch plates for movement coaxially with said bore, said mounting means being located between said radially projecting surfaces, means drivingly connecting the clutch plate carrying member with the input member, and fluid pressure responsive means separate from and offset radially with respect to said clutch plate carrying member, said fluid pressure responsive means being actuable to urge said first and second sets of clutch plates into driving engagement with one another.

2. Clutch assembly as claimed in claim 1, wherein said housing comprises a body portion defining said bore therein, said bore having an open end at said larger diameter portion, said housing further including a cover portion closing said open end of said bore, and a driving member interconnecting the housing with said clutch plate carrying member to provide a driving connection between said input member and said clutch plate carrying means.

3. Clutch assembly as claimed in claim 2, wherein said bearing means includes a pair of bearings rotatably supporting said input member for rotation relative to said fixed support and to said output member, said bearings being mounted at opposite ends of said bore, and means for circulating lubricating fluid through said bore and said bearings to lubricate the latter and said clutch plates.

4. Clutch assembly as claimed in claim 3, wherein at least one of said bearings cooperates with an oil seal carried by said housing to define a cavity therebetween, and a bypass passage bypassing said one bearing to communicate lubricating fluid passed through said bearing from said bore back into said bore to thereby relieve fluid pressure on said oil seal.

5. Clutch assembly as claimed in claim 4, wherein said fluid pressure responsive means is a fluid pressure responsive annular piston coaxial with the axis of said bore, said piston having an inner diameter and an outer diameter, the outer diameter being slidably and sealingly engaged with said smaller diameter portion of the bore.

6. Clutch assembly as claimed in claim 5, wherein a retainer member is rotatably mounted on said fixed support and includes a cylindrical portion rotatable about said fixed support and a radially projecting portion fixed for rotation with said input member, the inner diameter of said annular piston being sealingly and slidably engaged with said cylindrical portion, said radially projecting portion and said annular piston cooperating to define a cavity therebetween, and means for communicating fluid pressure into said cavity.

7. Clutch assembly as claimed in claim 1, wherein said clutch assembly includes means for circulating lubricating fluid through said bore and said bearing means, said bearing means cooperating with oil seals carried by said housing to define a cavity therebetween, and a bypass passage bypassing said one bearing to communicate lubricating fluid passed through said bearing means into said cavity around said bearing means to thereby relieve pressure on the oil seal.

8. Clutch assembly comprising a fixed support, an input member and an output member mounted on said fixed support, bearing means for rotatably mounting the input and output members on said fixed support for rotation relative to the fixed support and relative to one another, a first set of clutch plates drivingly connected to said output member, a second set of clutch plates drivingly connected with the input member and cooperatively arranged with the first set of clutch plates to provide a driving connection therebetween when the clutch is engaged, one of said members including a housing, said housing defining a stepped bore coaxial with the axis of rotation of said input and output members, said bore having larger and smaller diameter portions with a shoulder therebetween, said shoulder cooperating with the larger portion of the bore to define an annular cavity, an annular clutch plate carrying member coaxial with said bore and received within said annular cavity, said clutch plate carrying member having inner and outer diameters, said inner diameter slidably mounting said second set of clutch plates for movement coaxially with said bore, means drivingly connecting the clutch plate carrying member with the input member, and fluid pressure responsive means actuable to urge said first and second sets of clutch plates into driving engagement with one another, said fluid pressure responsive means being a fluid pressure responsive annular piston coaxial with the axis of said bore, said piston having an inner diameter and an outer diameter, the outer diameter being slidably and sealingly engaged with said smaller diameter portion of the bore.

9. Clutch assembly as claimed in claim 8, wherein a retainer member is rotatably mounted on said fixed support and includes a cylindrical portion rotatable about said fixed support and a radially projecting portion fixed for rotation with said input member, the inner diameter of said annular piston being sealingly and slidably engaged with said cylindrical portion, said radially projecting portion and said annular piston cooperating to define a cavity therebetween, and means for communicating fluid pressure into said cavity.

10. Clutch assembly as claimed in claim 9, wherein a drive pin drivingly connects the input member with said clutch plate carrying member.

* * * * *